Figure 1:
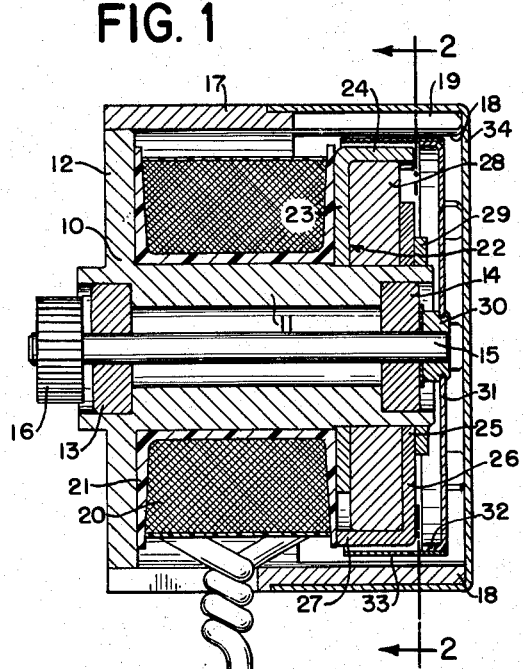

Dec. 3, 1963   A. W. HAYDON ETAL   3,113,231
HYSTERESIS TYPE SYNCHRONOUS MOTOR
Filed July 10, 1961

INVENTORS
ARTHUR W. HAYDON
RICHARD J. KAVANAUGH
RODNEY W. REDER
BY
ATTORNEYS 3,113,231
HYSTERESIS TYPE SYNCHRONOUS MOTOR
Arthur W. Haydon, Milford, Richard J. Kavanaugh, Bristol, and Rodney W. Reder, Waterbury, Conn., assignors to Consolidated Electronics Industries Corp., Waterbury, Conn., a corporation of Delaware
Filed July 10, 1961, Ser. No. 122,800
7 Claims. (Cl. 310—163)

The present invention relates to electrical motors, and is directed more specifically to novel and improved features of design and construction of hysteresis type synchronous motors.

In accordance with its broader aspects, the present invention is directed to the provision of a novel and improved hysteresis type synchronous motor of extremely simplified form, having a practical minimum of parts and embodying features of construction which permit the motor to be manufactured in extremely small, micro-miniature form. The motor of the present invention is adapted particularly for use in connection with military aircraft and rockets, for example, where reliable, accurate motors of extremely light weight and small physical bulk are desired.

More specifically, the invention is directed to a novel synchronous motor construction providing a self-starting, uni-directional motor with improved performance characteristics, which motor incorporates a bare minimum of parts arranged and constructed in an especially efficient manner. To this end, the new motor incorporates a first set of poles arranged in cylindrical array and cooperating with a second set of poles, also arranged in cylindrical array to form a cylindrical air gap. By virtue of an advantageous arrangement of the poles, an efficient revolving field may be established in the cylindrical air gap through the medium of a common coil winding, to synchronously drive a cylindrical rotor element.

In accordance with one of the specific aspects of the invention, one of the sets of poles defining the cylindrical air gap is comprised of first and second pole pieces, each having a predetermined plurality of pole elements disposed in laterally overlapping relation and with the pole elements of one pole piece being in laterally butted relation to the pole elements of the other pole piece. One of the sets of pole elements is shaded to provide a desired degree of flux lag, in accordance with known general theories.

In accordance with another specific aspect of the invention, particularly efficient operation of the motor is achieved by positioning the pairs of butted pole elements substantially centrally opposite the spaces between the pole elements on the opposite side of the cylindrical air gap. In addition, the construction advantageously is such that the angle subtended by a pair of butted pole elements is less than the angle subtended by the space opposite which the butted pole pair is centered.

A further advantageous feature of construction of the new motor resides in the provision of a combined shading coil and spacing element positioned between and physically separating the shaded and unshaded pole pieces. The improved construction results in simplicity and economy of manufacture and construction without, however, comprising the effectiveness of the motor.

Figure 2:
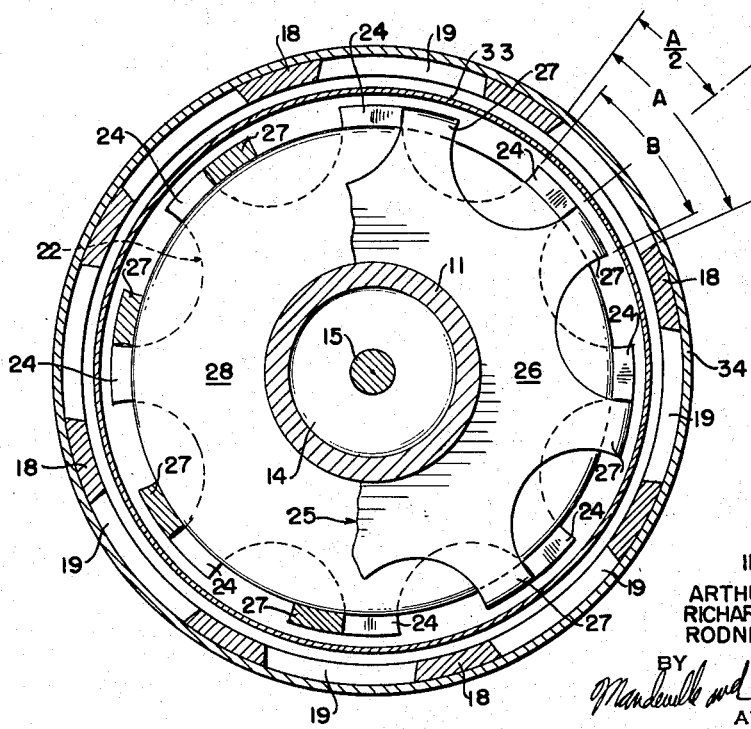

For a further description of the above and other advantageous features of the invention, reference should be made to the following detailed description and to the accompanying drawing, in which:

FIG. 1 is a longitudinal cross sectional view of an hysteresis type synchronous motor incorporating the features of the invention; and FIG. 2 is an enlarged cross sectional view taken generally along line 2—2 of FIG. 1.

Referring now to the drawing, the reference numeral 10 designates generally a motor core member formed of magnetizable material and comprising a tubular, cylindrical core 11 and an integral radial flange 12. At the opposite ends of the core 10 there are received and secured suitable bearings 13, 14 which journal a rotor shaft 15. A drive pinion 16 is fixed to one end of the rotor shaft 15, and, for the purpose of clear description only and not in any limiting sense, that end of the rotor shaft and motor will be designated and referred to as the front end, while the other end will be designated and referred to as the back or rear end of the motor.

Secured to the outer end of the core flange 12 and extending to the rear in surrounding relation to the core 11 is a field ring 17 formed of magnetizable material and having a slotted rear portion defining alternate pole elements 18 and spaces 19. Typically, the pole elements 18, which comprise outer pole elements of the motor assembly, are formed by milling or otherwise cutting straight slots in a cylindrical field ring blank, such that the slots or spaces 19 have parallel edges, while the edges of the pole elements 18 converge within the cylindrical outline of the motor.

The field ring defines a predetermined plurality of outer pole elements 18, typically eight, and these are arranged in cylindrical array, as shown in FIG. 2.

Advantageously, the width of the spaces or openings 19 is somewhat greater than that of the pole elements 18 and, in a particularly desirable form of the invention, the spaces 19 may be almost half again as wide as the pole elements 18 measured along their maximum width dimension. For example, in a typical micro-miniature motor made according to the invention and having an outside diameter of about 0.375 inch and an axial length of about 0.310 inch, the spaces 19 advantageously are about 0.0825 inch, while the maximum width of the pole elements 18 is about 0.060 inch.

Referring again to FIG. 1, a coil or winding 20, wound on a suitable plastic bobbin 21, is received closely over the cylindrical core 11 and is positioned against the front flange 12 thereof. The axial length of the coil 20 is such, in relation to the length of the tubular core 11, that a portion of the core projects rearward from the coil, into the area surrounded by the outer pole elements 18 of the field ring.

Received snugly over the rearward extension of the core 11 is a first pole piece 22, having a disc like body 23 and a predetermined plurality of rearwardly projecting elements 24 comprising a first set of inner pole elements. The number of pole elements 24 is the same as the number of outer pole elements 18—typically eight.

A second pole piece 25, also is mounted on the projecting portion of the core, and the second pole piece also comprises a disc like body portion 26 and forwardly projecting elements 27 comprising a second set of inner pole elements. The poles 27 of the second set project in a forward direction and are similar in number, size and shape to the poles 24 of the first set.

Advantageously, the pole pieces 22, 25 are maintained in predetermined axial separation and, in accordance with one of the specific aspects of the invention, the desired separation is effected by means of a shading coil 28 formed of conductive material. The shading coil is of annular configuration, being received closely over the projecting end of the core 11, and its dimensions are such as to extend radially outward to the inner pole members 24, 27 and substantially completely fill the annular space formed by the assembled pole pieces. The thickness of the shading coil 28 is such, in relation to the length of the inner pole elements 24, 27, as to permit substantial side-by-side overlap of these pole elements.

In the operation of the motor, the shading coil 28 functions to delay variations in the magnetic flux in the forwardly extending inner pole elements 27 relative to flux variation in the rearwardly extending inner pole elements 24. This determines the direction of rotation of the motor, in accordance with well known principles.

In accordance with one of the important, specific aspects of the invention, the sets of inner poles 24, 27 are arranged in laterally butted relation, substantially as indicated in FIG. 2. To this end, the pole pieces 22, 25 are rotatably oriented in the desired manner relative to each other and also relative to the outer poles 18, and then secured in place on the core 11 by suitable means, such as a crimped ring 29.

In accordance with another specific and advantageous feature of the invention, the butted pairs of inner pole pieces 24, 27 are centered directly opposite the spaces 19 between the outer poles 18, and the relative dimensions of the butted inner pole pieces and the opposed spaces between the outer pole elements are such that the radial angle subtended by the butted inner pole elements is less than the radial angle subtended by the spaces 19. This is illustrated by the angles indicated at A and B in FIG. 2. Thus, in a typical motor whose outside dimensions are approximately 0.375 inch diameter and approximately 0.310 inch axial length, the spacings 19 may be about 0.0825 inch in width, while the butted pole elements 24, 27 have a combined width of about 0.068 inch, the diameter of the outer pole elements 18 being about 0.3263 inch and the diameter of the inner pole elements 24, 27 being about 0.305 inch.

As indicated in FIG. 1, the rotor shaft 15 of the motor has portions extending forward and rearward of the bearings 13, 14. The forward projection of the shaft mounts the drive pinion 16, while the rearward projection mounts a collar 30. The collar 30 is fixed to the shaft and, in turn, has fixed thereto a disc like rotor element 31.

At its outer periphery, the rotor element 31 has an inturned and forwardly projecting flange 32 mounting a cylindrical rotor element 33 of magnetic material specially treated for the desired hysteresis properties. The cylindrical rotor element 33 is mounted for rotation within the cylindrical air gap defined by the outer pole elements 18 and the pairs of inner pole elements 24, 27 and is thus acted upon by magnetic fluxes developed in the pole elements.

A suitable cup shaped outer casing 34 is received over the rear portion of the field ring 17 and serves to close off the entire back section of the motor assembly.

The new motor assembly is particularly advantageous in respect of its extreme structural simplicity, involving a virtual minimum of individual parts and thus enabling the motor to be economically and practically manufactured in extremely small, micro-miniature sizes. Thus, by way of example only, typical specifications of a microminiature motor constructed according to the present invention include the following: Diameter, 3/8 inch; length, 9/32 inch; weight, 1/8 ounce; power consumption, 0.5 watt max. at 115 volts, 400 cycles. The motor is self starting and runs synchronously at 3,000 r.p.m. with sufficient torque to reliably operate micro miniature elapsed time indicators, repeat cycle timers, time delay relays, micro miniature blowers and the like. A motor of the foregoing specifications may be manufactured on an economical basis, is efficient in operation, and is highly reliable in its intended environments. The motor is particularly useful for aircraft and missile applications, for example, where extremely small size and weight are of overriding significance.

It should be understood, however, that the specific form of the invention herein illustrated and described is intended to be representative only, as certain changes may be made therein without departing from the clear teachings of the disclosure. Accordingly, reference should be made to the following appended claims in determining the full scope of the invention.

I claim:
1. An hysteresis type synchronous motor comprising a cylindrical core, a magnet winding mounted on and surrounding the front portion of the core, a cylindrical field ring mounted on the front of the core and extending rearward beyond the core in surrounding relation to the back portion of the core, the rearward end of said field ring forming a predetermined plurality of outer pole elements, a first pole piece mounted on the back portion of said core adjacent said winding and having said predetermined plurality of inner pole elements projecting rearward, a second pole piece mounted on the back portion of said core in predetermined spaced relation to said first pole piece and having said predetermined plurality of inner pole elements projecting forward between the rearwardly projecting pole elements of said first pole piece, said inner and outer pole elements defining a cylindrical air gap, said pole pieces being mounted with the respective pole elements thereof in laterally butted relation, pairs of said butted inner pole elements being disposed substantially symmetrically opposite the spaces between said outer pole elements and in non-overlapping relation to said outer pole elements, shading coil means mounted between said pole pieces, and serving also as means for maintaining said pole pieces in said predetermined spaced relation, and cylindrical rotor means mounted for rotation within said cylindrical air gap.

2. The motor of claim 1, in which the angles subtended by said butted pairs of inner pole pieces are less than the angles subtended by the spaces between poles of the field ring, said butted pole elements are of equal width, and said field ring poles are tapered radially inwardly.

3. An hysteresis type synchronous motor comprising a circular field ring having at one end a predetermined plurality of pole elements in cylindrical array about a first diameter and defining predetermined spaces therebetween, first and second pole pieces each having said predetermined plurality of pole elements arranged in cylindrical array about a second diameter and forming with the pole elements of said field ring a cylindrical air gap, adjacent pairs of the pole elements of said pole pieces being in laterally butted relation and being disposed substantially symmetrically opposite the spaces between said field ring pole elements and in non-overlapping relation to said field ring pole elements, the pole elements of one of said pole pieces being shaded, and a cylindrical rotor element mounted for rotation in said cylindrical air gap.

4. The motor of claim 3, in which said pole pieces are spaced apart and the respective pole elements of each extend toward the other.

5. The motor of claim 3, in which the angle subtended by a butted pair of pole elements is less than the angle subtended by a space between pole elements of said field ring, and said first diameter is greater than said second diameter.

6. The motor of claim 3, in which the cylindrical rotor elements comprises a first rotor element mounted for rotation about a predetermined shaft axis and extending radially outward from said axis to the region of said cylindrical air gap, and a second rotor element substantially in the form of a cylindrical ring secured adjacent one end of said first rotor element and having its free end portions projecting into said cylindrical air gap, said second rotor element being formed of magnetic material specially treated for predetermined hysteresis properties.

7. The motor of claim 3, in which said first and second pole pieces include disc-like body portions arranged in spaced relation, the pole elements of the respective pole pieces extending generally toward each other and in opposite directions whereby said disc-like body portions and said pole elements form a predetermined annular space, a shading ring of conductive material occupying substantially the entire annular space defined by said disc-like body portions and said pole elements and being operative to maintain said disc-like body portions in predetermined spaced relation.

References Cited in the file of this patent
UNITED STATES PATENTS

| | | |
|---|---|---|
| 2,438,799 | Bloser | Mar. 30, 1948 |
| 2,531,518 | Kuhlmann | Nov. 28, 1950 |
| 2,572,632 | Kurz | Oct. 23, 1951 |